United States Patent [19]
Hull et al.

[11] Patent Number: 5,109,739
[45] Date of Patent: May 5, 1992

[54] SLIDE HAMMER TOOL

[76] Inventors: Harold L. Hull, 401 Canyon Way #43, Sparks, Nev. 89434; Brian D. Hale, 5961 Old School Rd., Pleasanton, Calif. 94566

[21] Appl. No.: 673,463

[22] Filed: Mar. 22, 1991

[51] Int. Cl.⁵ .............................. B25B 19/00
[52] U.S. Cl. .............................. 81/463; 81/27; 29/254; 29/275
[58] Field of Search .............. 81/463, 20, 26, 27; 29/254, 255, 275, 264, 277; 173/90, 91

[56] References Cited

U.S. PATENT DOCUMENTS

| | | | |
|---|---|---|---|
| 1,403,919 | 1/1922 | Seppmann | 29/254 X |
| 1,597,159 | 8/1926 | Johnson et al. | 29/254 |
| 1,923,122 | 8/1933 | Smith | 81/463 X |
| 1,958,329 | 5/1934 | Beard | 29/254 |
| 2,791,926 | 5/1957 | Guyton | 29/275 X |
| 3,799,011 | 3/1974 | Davis, Jr. | 81/121 R |
| 4,628,776 | 12/1986 | Witbeck | 81/466 |
| 4,675,968 | 6/1987 | Bartlett | 29/254 |
| 4,748,878 | 6/1988 | Chen | 81/466 |
| 4,753,104 | 6/1988 | Stroxier | 72/457 |
| 4,755,088 | 7/1988 | Vajda | 408/68 |
| 4,864,902 | 9/1989 | Doorley | 81/466 |

Primary Examiner—D. S. Meislin

[57] ABSTRACT

A slide hammer tool adapted to be used with attachments to engage various standard wrenches such as braking bars, open end wrenches, box wrenches, etc., and cooperates with a socket set to loosen or tighten "frozen" bolts and nuts.

4 Claims, 3 Drawing Sheets

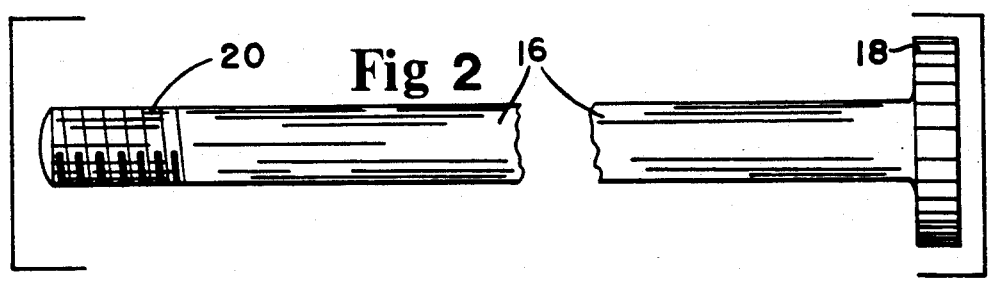
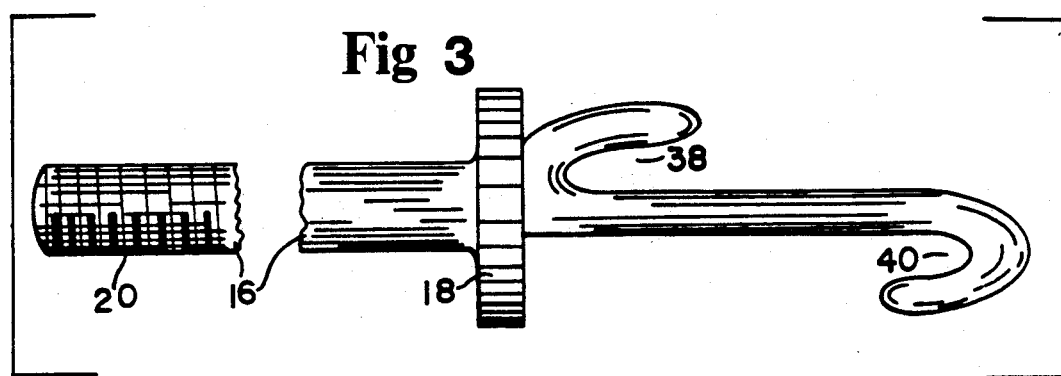
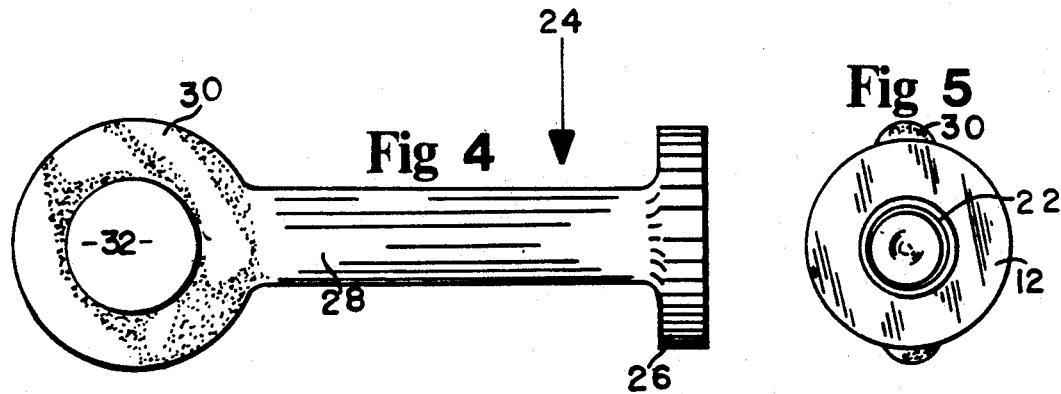
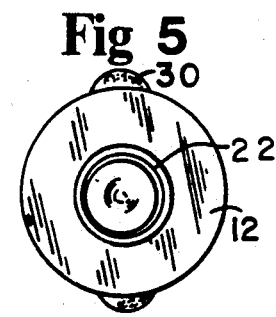
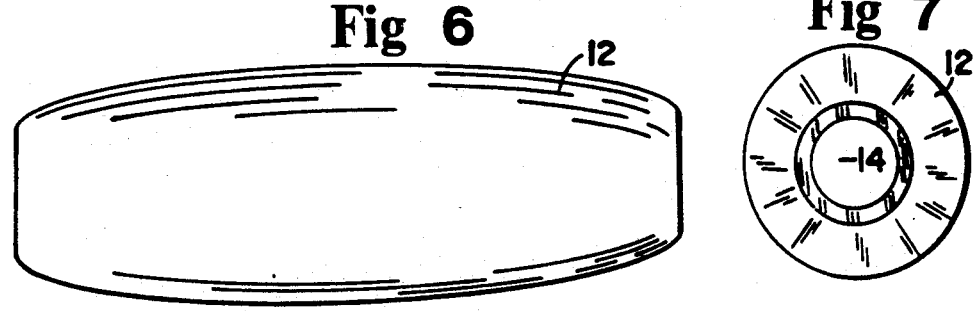
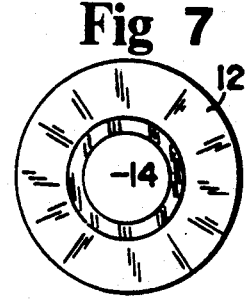

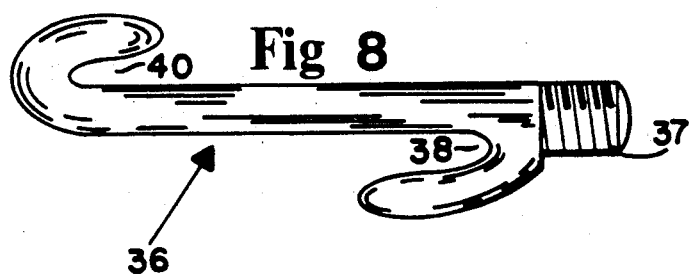
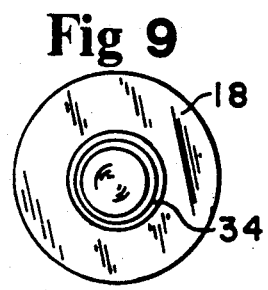
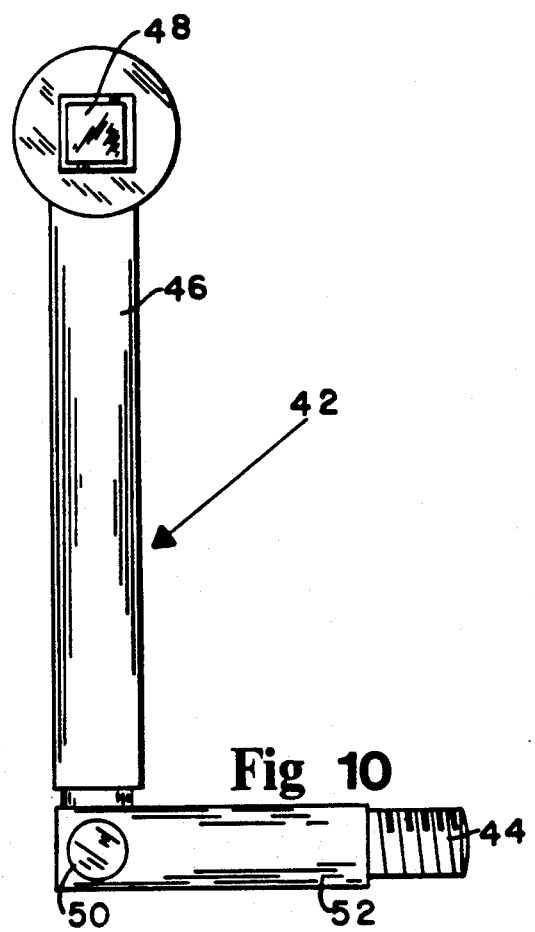
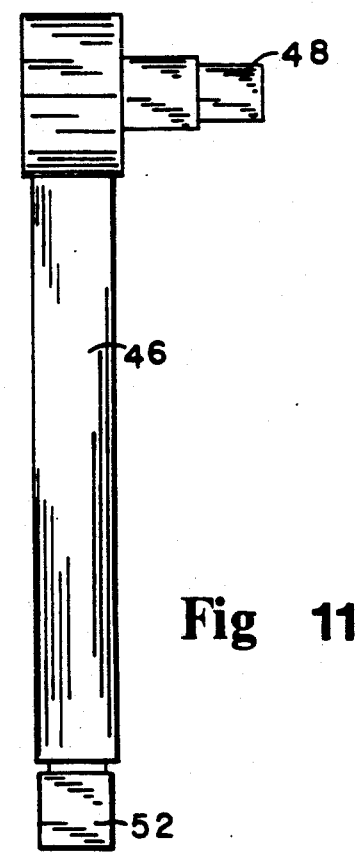

SLIDE HAMMER TOOL

FIELD OF THE INVENTION

This invention relates to slide hammers and more particularly to a slide hammer adapted to be used with wrenches or a socket set.

BACKGROUND OF THE INVENTION

In the past a number of tools have been developed using the slide hammer principle, that is, a weight which slides along a shaft with a stop which causes an impact to the work piece and has been used extensively in auto-body work such as U. S. Pat. No. 4,753,104 which is a dent removing, tool or the impact puller and installer of U.S. Pat. No. 4,6748,878.

Other devices have been provided to loosen "frozen" nuts and bolts by providing a strike tool which must be struck with a hammer such as U.S. Pat. No. 4,864,902 or the use of the handle as a striking force of U.S. Pat. No. 4,728,828.

In some hard to reach areas it is difficult to get a socket on a nut or bolt and then even more difficult to find room to swing a hammer to hit the handle affixed to the socket and in the case of a ratchet handle, the blow on the handle is destructive to the ratchet teeth. In cases where and open end wrench is used it is again difficult to hit the wrench at the proper angle to loosen or tighten a nut or bolt. Also, this type of arrangement can be dangerous as the wrench must be held with one hand while being struck with a hammer, placing the user's hand in danger of being struck also, and the present invention addresses these and other problems.

SUMMARY OF THE INVENTION

It is therefore a primary object to provide a slide hammer tool adapted to be used with a socket set and braking bar handle.

It is a further object to provide a slide hammer tool adapted to be used with other wrenches such as open end wrenches or box end wrenches.

Also, it is an important object to provide a slide hammer tool that has multiple attachments that may be used for special situations.

Another object is to provide a slide hammer tool that is adapted to be used at multiple angles including 90 degrees.

Other objects and advantages will become apparent when taken into consideration with the following drawings and specifications.

BRIEF DESCRIPTION OF THE DRAWINGS

FIG. 2 is a side view of the main shaft and a first abutment.
FIG. 3 is a side view of the main shaft and abutment with an adapter attached.
FIG. 4 is a side view of a second abutment and ring.
FIG. 5 is an end view of FIG. 4.
FIG. 6 is a side view of the slide hammer portion.
FIG. 7 is an end view of FIG. 6.
FIG. 8 is a side view of a wrench adapter.
FIG. 9 is an end view of FIG. 2.
FIG. 10 is a side view of a socket adapter.
FIG. 11 is a second side view of FIG. 10.

DETAILED DESCRIPTION OF THE DRAWINGS

Figure 1:
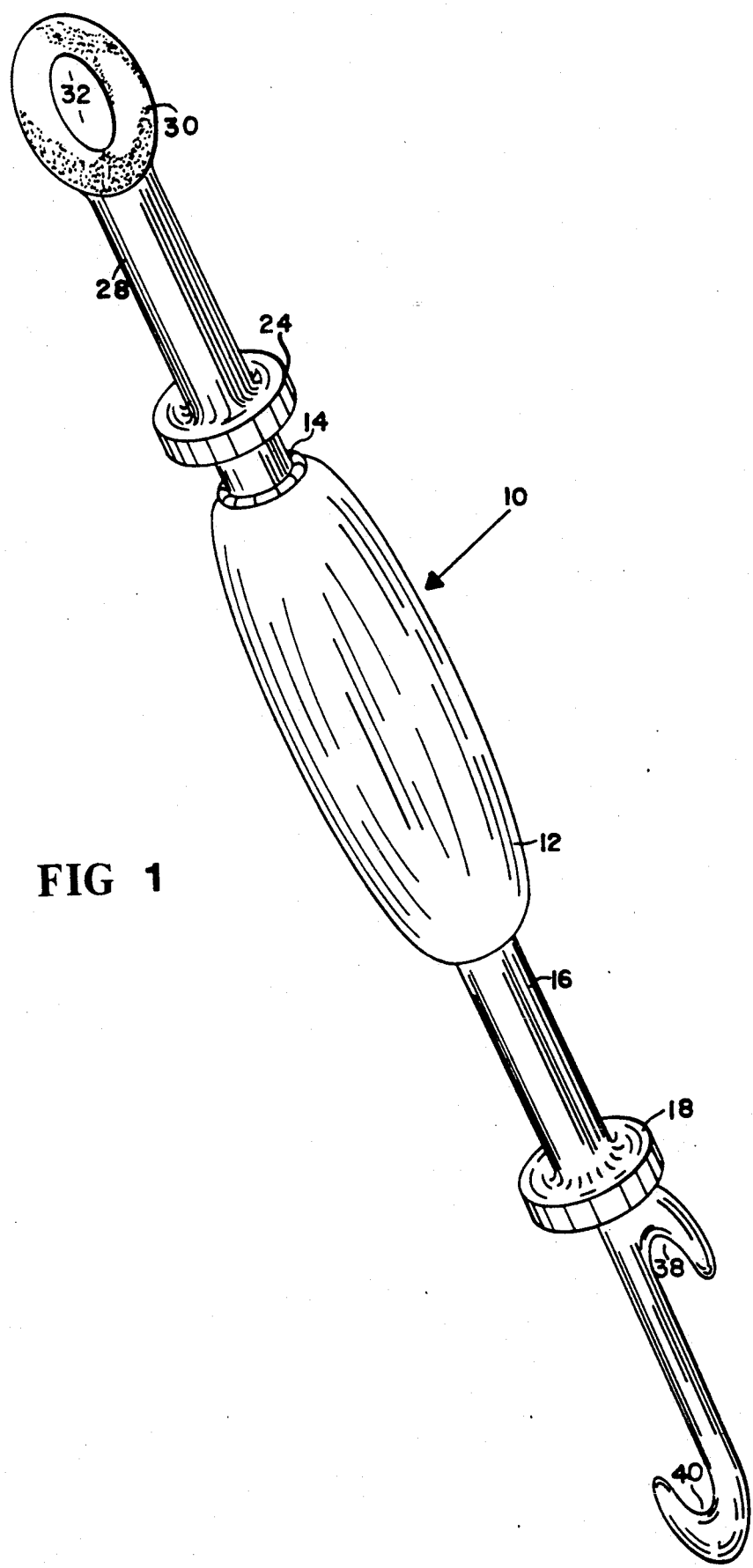
FIG. 1 is a perspective view of the present invention.

Referring now in detail to the drawings wherein like characters refer to the same elements throughout the various drawings, 10 is a general over-view of the slide-hammer tool with 12 being an element that acts as the hammer portion and is a metal, elongated element with a bore 14 through it's length which cooperates with shaft 16 which allows hammer 12 to reciprocate on shaft 16 with stop 18 being an intricate part of shaft 16, shaft 16 also having outside threads 20 cooperating with internal threads 22 of element 24, element 24 also having stop 26, shaft 28 and ring end 30 containing opening 32.

FIG. 9 shows an end view of shaft 16 with stop 18 having threads 34 to receive multiple, exchangeable elements such as substantially S-shaped element 36, 36 having outside threads 37 cooperating with internal threads 34 of shaft 16 in stop 18. Element 36, being substantially S-shaped, has hooks 38 and 40, respectively. Also, element 42 can be attached to shaft 16 and stop 18 by mating threads 44, element 42 being substantially a braking bar with handle 46, square shank 48 (which cooperates with a socket set), (not shown) and handle 52 with linkage 50 connecting handle 46 and handle 52.

It now be seen that we have provided a slide-hammer which can be utilized in conjunction with a standard socket set and braking bar, as the eye in the circle of the end may be placed over a standard braking bar handle and by using the slide-hammer, either tighten or loosen a nut or bolt.

Also it will be seen that by using the hook adapter that the hooks can be used to capture a flat wrench such as an open end wrench or box wrench and either push or pull against it.

It will also be noted that we have provided a braking bar attachment with a linkage arrangement to reach awkward paces at different angles.

Although the invention has been shown and described in what is conceived to be the most practical and preferred embodiment, it is recognized that departures may be make therefrom within the scope and spirit of the invention, which is not to be limited to the details disclosed herein but is to be accorded the full scope of the claims so as to embrace any and all equivalent devices and apparatus.

Having described out invention, what we claim as new and desire to secure by letters patent is:

1. A slide hammer tool comprising; a first elongated shaft having first and second ends, a first abutment stationarily mounted on said first end, said abutment having internal threads, said second end having external threads, a second elongated shaft having first and second ends, a second abutment stationarily mounted on said first end, said second abutment having internal threads cooperating with said external threads on said second end of said first shaft, a ring stationarily mounted on said second end of said second shaft, said ring having it's internal diameter of a size cooperating with a handle of a braking bar, a weight slidably mounted on said first shaft, and an attachment threadably engaging said internal threads of said first abutment of said first shaft, whereby, when said ring is placed over the handle of said braking bar with said attachment being used as a handle, said weight may be forcibly struck against said first or second abutment to apply a shock to said braking bar handle,
wherein said attachment is a breaking bar, said breaking bar having a shank on one of its ends, said shank for use with a socket set, said breaking bar having a pivotable connection on its distal end, said pivotable connection cooperating with a second bar, said second bar having threads on its distal end, said threads cooperating with said internal threads of said first abutment of said first shaft.

2. A slide hammer tool comprising; a first elongated shaft having first and second ends, a first abutment stationarily mounted on said first end, said abutment having internal threads, said second end having external threads, a second elongated shaft having first and second ends, a second abutment stationarily mounted on said first end, said second abutment having internal threads cooperating with said external threads on said second end of said first shaft, a ring stationarily mounted on said second end of said second shaft, said ring having its internal diameter of a size cooperating with a handle of a breaking bar, a weight slidably mounted on said first shaft, and an attachment threadably engaging said internal threads of said first abutment of said first shaft, whereby, when said ring is placed over the handle of said breaking bar with said attachment being used as a handle, said weight may be forcibly struck against said first or said second abutment to apply a shock to said breaking bar handle, wherein said attachment is an elongated member with a first and second end, said first end having threads cooperating with said threads of said first abutment, said second end being substantially S-shaped forming two U-shaped hooks, with their common legs being an integral part of said elongated member with their Un-common legs being substantially parallel, said U-shaped hooks being of a size and shape to cooperate with the body of conventional open end and box end wrenches, whereby, when one of said U-shaped hooks is placed over an end of one of said wrenches, which is furthest from a workpiece, said attachment, said slide hammer and said wrenches cooperate together to impart an impact to said workpiece.

3. The devise of claim 1 or 2 in which said weight is of a shape and size to be comfortably grasped in a hand.

4. The devise of claim 1 or 2 in which said slide hammer tool is made of metal.

* * * * *